No. 710,987. Patented Oct. 14, 1902.
W. B. MICHAEL.
ADJUSTING DEVICE FOR WHEEL PLOWS.
(Application filed May 17, 1902.)
(No Model.)
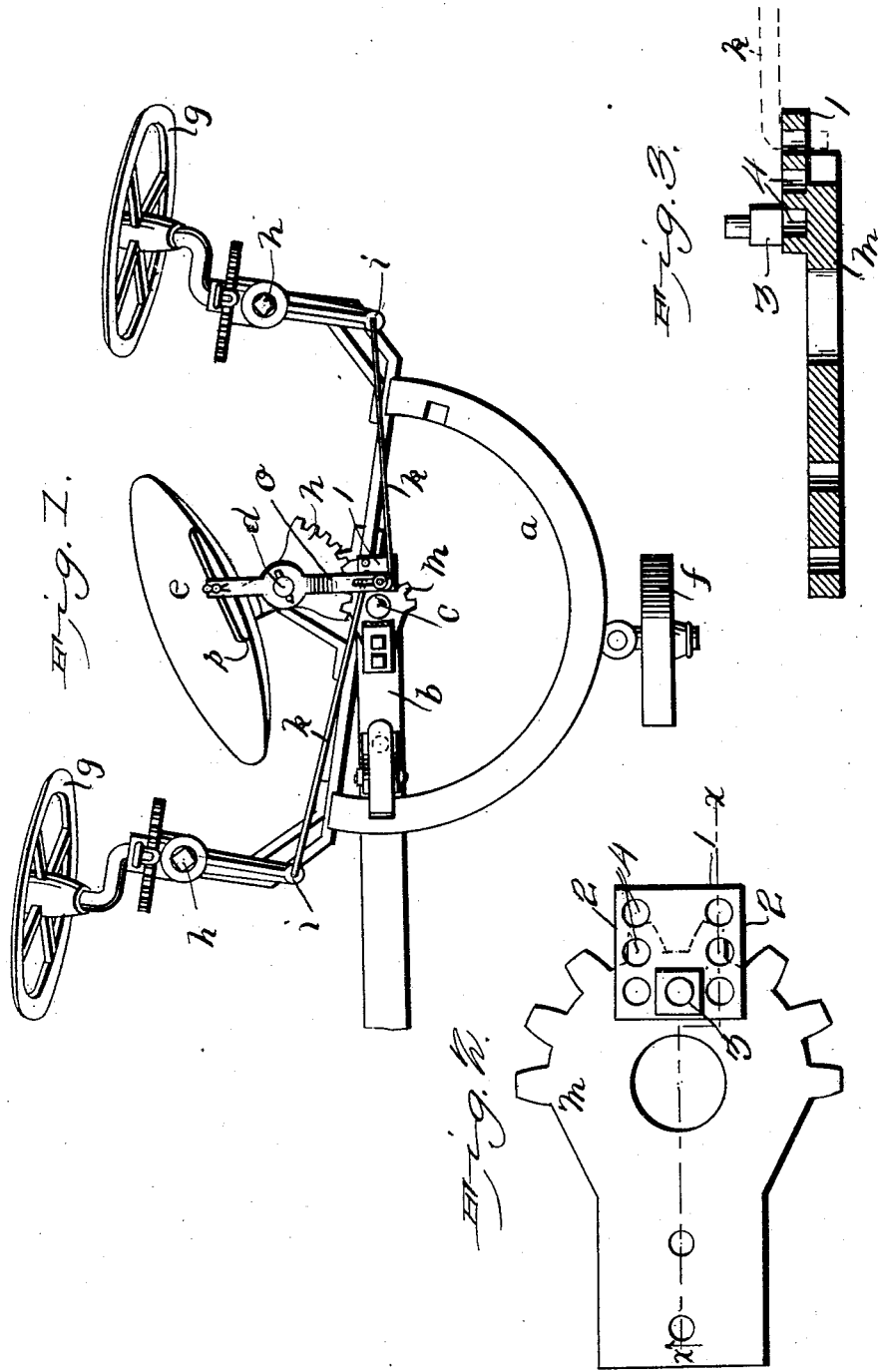
Witnesses
W. B. Michael, Inventor.
by C. A. Snow & Co.
Attorneys

UNITED STATES PATENT OFFICE.

WILLIAM BYRON MICHAEL, OF CHATTANOOGA, TENNESSEE.

ADJUSTING DEVICE FOR WHEEL-PLOWS.

SPECIFICATION forming part of Letters Patent No. 710,987, dated October 14, 1902.

Application filed May 17, 1902. Serial No. 107,835. (No model.)

*To all whom it may concern:*

Be it known that I, WILLIAM BYRON MICHAEL, a citizen of the United States, residing at Chattanooga, in the county of Hamilton and State of Tennessee, have invented new and useful Adjusting Devices for Wheel-Plows, of which the following is a specification.

My invention relates to improvements in adjustable wheeled plows of that class in which the standard that carries the plow is automatically adjusted by gearing which connects the same to the beam or tongue that forms the draft element and in which the furrow-wheels are carried by pivoted supports having arms which are connected to the gear that is turned by the beam or draft element, whereby the plow and furrow-wheels are automatically adjusted by turning the beam or draft element; and the object of my present improvements is to provide means whereby the angles of the plow and furrow-wheels may be predetermined, so that the plow may be set to run at such an angle with reference to the line of draft as to cut a furrow of any desired width.

With this object in view my invention consists in the peculiar construction and combination of devices hereinafter fully set forth and claimed.

In the accompanying drawings, Figure 1 is a top plan view of a reversible wheeled disk plow known as the "Dixie Reversible Disk Plow," provided with means for varying the respective angles of the disk and furrow-wheels with reference to the line of draft. Fig. 2 is a detail top plan view of the reversing-gear which is connected to the beam or draft element, showing the same provided with a block or arm which forms improved means for predetermining the angle of the disk and furrow-wheels with reference to the line of draft and for varying the said angle. Fig. 3 is a detail vertical longitudinal sectional view of the same, taken on a plane indicated by the line $x\ x$ of Fig. 2.

The construction of the reversible wheeled disk plow shown in Fig. 1 is well understood, and I will merely refer to the parts thereof, $a$ being the frame, $b$ the beam or tongue pivotally connected to the frame, as at $c$, $d$ being the spindle of the standard, which is pivotally mounted and carries the revolving disk $e$, $f$ being the land-side wheel, and $g$ being the furrow-wheels, the same being carried by the pivotally-mounted members $h$, which have the inwardly-extending arms $i$, that are connected by rods $k$ to the segment-gear $m$, which is turned by and attached to the beam or tongue $b$ and meshes with the segment-gear $n$, that turns the standard that carries the disk.

When the tongue or beam $b$ is turned to cause the segment-gears $m\ n$ to reverse the disk $e$, the rods $k$ by their connections with the gear $m$ and the arms $i$ simultaneously and automatically also reverse the furrow-wheels $g$ to dispose them at an appropriate angle with reference to the line of draft and the disk $e$. It will be understood that by lengthening or shortening the distances between the connections of said rods $k$ with the gear $m$ and the arms $i$ the extent of the angular movement of the furrow-wheels and the disk at each operation of the beam or tongue $b$ may be predetermined to dispose the disk at such an angle with relation to the line of draft as to cause the disk to cut a wide or narrow furrow, as may be desired, and to dispose the wheels $g$ at such an angle with reference to the line of draft and the disk as to cause the latter to move parallel with the line of draft and avoid lateral movement or drifting of the plow. To effect such adjustment of the connections between the gear $m$ and the arms $i$ is the object of my present improvements, and I will now describe one means by which the same may be carried into effect, it being understood that I do not limit myself to the specific construction and combination of devices hereinafter described, as modifications may be made therein without departing from the spirit of my invention and within the scope of the appended claims.

On the gear $m$ is a block or arm 1, which projects rearwardly therefrom. The said block or arm is preferably of the form shown in detail in Fig. 2, with parallel sides 2 and with an upstanding stud 3, which forms the pivotal connection with the arm $o$, that is pivoted on the spindle $d$ and serves to carry and adjust the scraper $p$, that is disposed in the concaved face of the disk. This scraper is preferably of the construction described in Letters Patent of the United States No.

693,042, granted to me February 11, 1902, and is not more fully referred to herein, as the same forms no part of my present improvements. The stud 3 spaces the arm o above the arm or block 2 and causes said arm o to clear the connecting-rods k. The block or arm 2 is provided near its opposite sides with a plurality of adjusting-openings 4, which are disposed in a longitudinal series and which are adapted to receive the downturned ends 5 of the connecting-rods k, as shown in detail in Fig. 3, to effect pivotal connections between the said rods and the said block 1, and hence the gear m, and to also adjustably connect the said rods k to the arm or block 1 to predetermine the angles between the disk and the furrow-wheels, and hence set the furrow-wheels and the disk in such manner as to cause the disk to cut a furrow of any desired width.

While my invention is here shown and described as applied to a disk plow, it will be understood that the same is also adapted for use in connection with other forms of wheeled plows, and I do not desire to limit myself in this particular.

Having thus described my invention, I claim—

1. In a reversible wheeled disk plow, the combination of a disk and furrow-wheels with means to simultaneously reverse the same and means to vary the angle between said disk and furrow-wheels, substantially as described.

2. In a reversible wheeled disk plow, the combination of a disk and furrow-wheels with a reversing element, gears connecting the same to the disk standard, and adjustable connections between the reversing-element gear and the reversible supports of the furrow-wheels, substantially as described.

3. In a reversible wheeled disk plow, the combination of pivoted standards to respectively carry and reverse the disk and furrow-wheels, a pivotally-mounted reversing element having a gear, a gear on the disk standard, engaged with the first-mentioned gear, and adjustable connections between the furrow-wheel standards and the reversing-element gear, substantially as described.

4. In a reversible wheeled disk plow, the combination of pivoted standards to respectively carry the disk and furrow-wheels, the latter standards having arms, a pivotally-mounted reversing element having a gear, a gear on the disk standard engaged with the first-mentioned gear, and connecting-rods attached to the furrow-wheel-standard arms and adjustably connected to the reversing-element gear, substantially as described.

5. In a reversible wheeled disk plow, the combination of pivoted standards to respectively carry the disk and furrow-wheels, the latter standards having arms, a pivotally-mounted reversing element having a gear provided with adjusting-openings at varying distances from the axis thereof, a gear on the disk standard engaged with the first-mentioned gear, and connecting-rods attached to the furrow-wheel-standard arms and adapted to be engaged with the adjusting-openings of the reversing-element gear, substantially as described.

6. In a reversible wheeled disk plow, the combination of pivoted standards to respectively carry the disk and furrow-wheels, the latter standards having arms, a pivotally-mounted reversing element having a gear provided with a radially-projecting arm, said arm being provided with adjusting-openings, a gear on the disk standard engaged with the first-mentioned gear and connecting-rods attached to the furrow-wheel-standard arms and adapted to be engaged with the adjusting-openings of the arm of the reversing-element gear, substantially as described.

7. In a reversible wheeled disk plow, a gear having an arm projecting from its rear side, disposed on its upper side and having an upstanding stud and further provided near its opposite sides with adjusting-openings, for the purpose set forth, substantially as described.

8. In a wheel-plow, a pivotally-mounted plow-standard having a gear, in combination with a draft element having a gear engaging that of the standard, a furrow-wheel having a pivotally-mounted support, and an adjustable connection between the latter and one of said gears, whereby the plow and furrow-wheel may be set to run at any desired angle, substantially as described.

9. In a reversible wheeled disk plow, the combination of a disk and furrow-wheels, with means to simultaneously reverse the same, and means included in the said reversing means to vary and predetermine the angle between the disk and furrow-wheels, substantially as described.

In testimony that I claim the foregoing as my own I have hereto affixed my signature in the presence of two witnesses.

WILLIAM BYRON MICHAEL.

Witnesses:
C. E. MILLS,
J. C. SHELTON.